United States Patent
Verstraete

(10) Patent No.: US 6,600,916 B1
(45) Date of Patent: Jul. 29, 2003

(54) METHOD AND RADIO COMMUNICATION NETWORK FOR PROTECTION OF A SUBSCRIBER IDENTITY MODULE CONFIGURED IN A MOBILE STATION

(75) Inventor: Hans Verstraete, Heist Op Den Berg (BE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/521,499

(22) Filed: Mar. 9, 2000

(30) Foreign Application Priority Data

Mar. 9, 1999 (DE) .......................................... 199 10 385

(51) Int. Cl.[7] ................................................ H04M 1/66
(52) U.S. Cl. ...................................... 455/410; 455/515
(58) Field of Search ................................ 455/410, 411, 455/458, 433, 432, 515, 426

(56) References Cited

U.S. PATENT DOCUMENTS 6,351,641 B2 * 2/2002 Verkama ..................... 455/426
6,377,791 B1 * 4/2002 Pirila ......................... 455/410

FOREIGN PATENT DOCUMENTS

EP              0 822 727 A2     2/1998

* cited by examiner

*Primary Examiner*—Vivian Chin
*Assistant Examiner*—Tu X Nguyen
(74) *Attorney, Agent, or Firm*—Laurence A. Greenberg; Werner H. Stemer; Ralph E. Locher

(57) ABSTRACT

A method for protecting a subscriber identity module in a mobile station. A network portion or network end is provided for establishing a radio communication network with mobile stations. A subscriber identity module is used to identify a mobile subscriber associated with a particular one of the mobile stations. When the particular one of the mobile stations is moved from an initial supply area to a new supply area, the particular one of the mobile stations is used to initiate updating of the management of the mobile station. Subsequently, subscriber data, associated with the particular one of the mobile stations, which is stored in a previously responsible subscriber database at the network portion is canceled. A radio paging message is transmitted from the network portion to mobile stations in the initial supply area. If at least one of the mobile stations in the initial supply area responds to the radio paging message and transmits a mobile subscriber identity, the network portion is used to evaluate the mobile subscriber identity that has been received from the at least one of the mobile stations. Evaluation of the received mobile subscriber identity automatically provides information about at least one further mobile station that is active without authorization and using the same subscriber identity module.

10 Claims, 1 Drawing Sheet

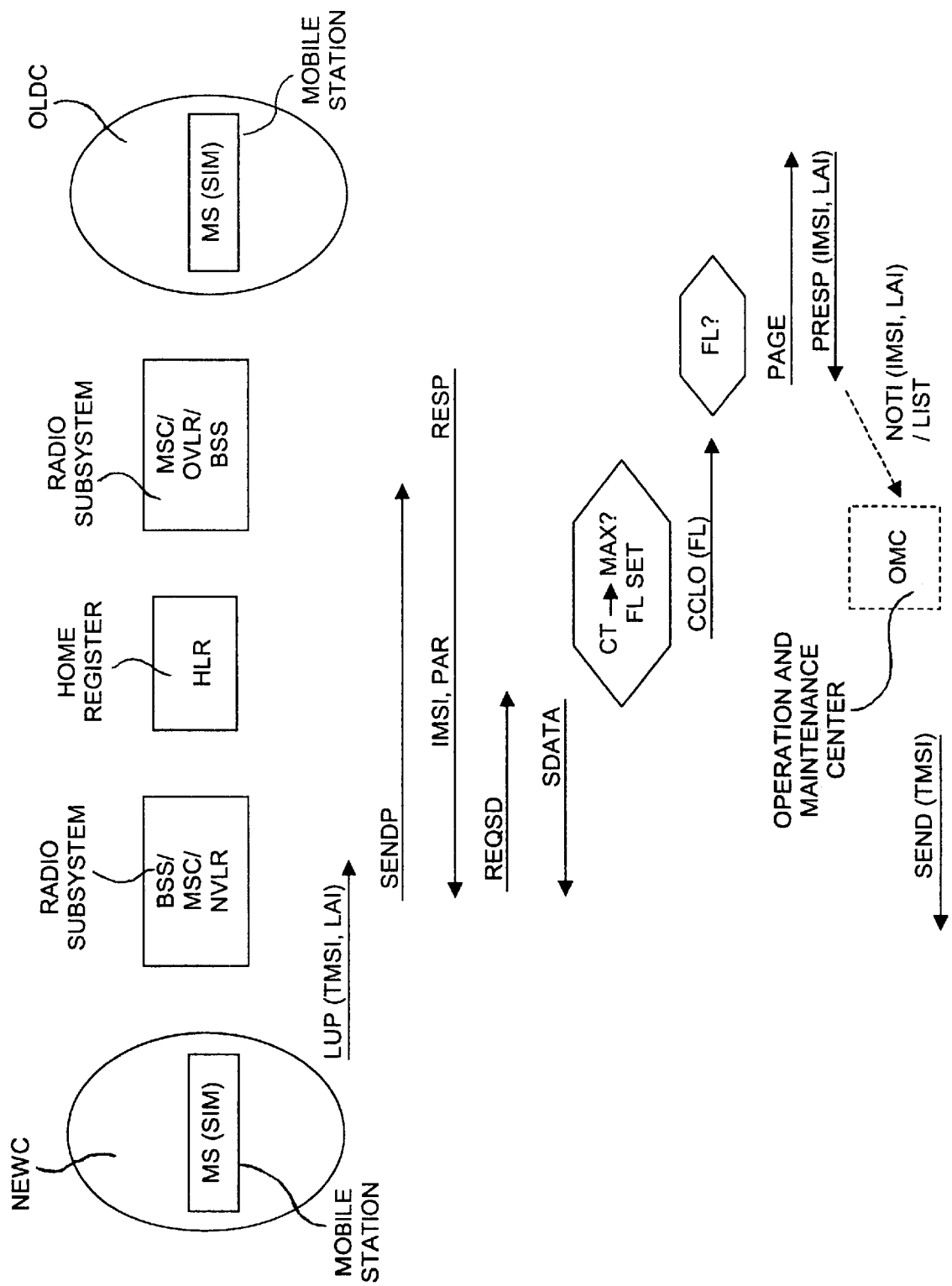

METHOD AND RADIO COMMUNICATION NETWORK FOR PROTECTION OF A SUBSCRIBER IDENTITY MODULE CONFIGURED IN A MOBILE STATION

BACKGROUND OF THE INVENTION

Field of the Invention

The invention relates to a method for protecting a subscriber identity module configured in a mobile station where the method also enables a mobile subscriber to be identified in a radio communication network, and to a corresponding radio communication network.

As is known, there are a number of types of security functions performed in a radio communication network, for example networks in the GSM Standard. EP-0 822 727 A2 describes a method and a system, in which mobile subscribers identify themselves in the network using a subscriber identity module, also called a SIM card (Subscriber Identity Module) or a smart card. The subscriber identity module is normally located in the mobile station that is used by the subscriber.

Furthermore, it is generally known for the mobile station to initiate updating of the management of the subscriber (location update) when the mobile subscriber moves from one supply area to another supply area. Subscriber data that is stored in a previously responsible subscriber database, for example in a visitor register (visitor location register) that is associated with the previous supply area, is cancelled at the network end. The request to cancel the subscriber data (cancel location) which is sent to the previous subscriber database is initiated in the network by a further subscriber database, for example the home register (home location register).

In the situation where the subscriber identity module is "cracked", it is possible for third parties to make an unauthorized "clone" (SIM-card cloning), which leads to the unauthorized subscriber being able to use voice and data links with the forged card, at the expense of the card holder. However, the card holder is not aware of the misuse of his subscriber identity module, if at all, until he is billed, and he or the network operator furthermore, cannot easily determine who has caused the misuse. The radio communication network of a conventional type does not check whether more than one mobile subscriber with the same identity is active in the network.

SUMMARY OF THE INVENTION

It is accordingly an object of the invention to provide a method and a radio communication network which enables better protection of the subscriber identity module from misuse, and which overcomes the hereinafore-mentioned disadvantages of the heretofore-known methods and devices of this general type.

With the foregoing and other objects in view there is provided, in accordance with the invention, a method for protecting a subscriber identity module in a mobile station. A network portion or network end is provided for establishing a radio communication network with mobile stations. A subscriber identity module is used to identify a mobile subscriber associated with a particular one of the mobile stations. When the particular one of the mobile stations is moved from an initial supply area to a new supply area, the particular one of the mobile stations is used to initiate updating of the management of the mobile station. Subsequently, subscriber data, associated with the particular one of the mobile stations, which is stored in a previously responsible subscriber database at the network portion is canceled. A radio paging message is transmitted from the network portion to mobile stations in the initial supply area. If at least one of the mobile stations in the initial supply area responds to the radio paging message and transmits a mobile subscriber identity, the network portion is used to evaluate the mobile subscriber identity that has been received from the at least one of the mobile stations.

The network portion uses the additional radio paging message to the old supply area in which the mobile subscriber is, in fact, no longer located to check whether another mobile station is still active and responds to the paging with the same subscriber identity as that of the authorized subscriber. If this situation occurs, the evaluation of the received subscriber identity automatically provides information about at least one further mobile station which is active without authorization and which is using the same subscriber identity module, so that further steps can be initiated against misuse of the subscriber identity module in this mobile station, and thus against the person causing the misuse, by the subscriber or by the network operator. This results in reliable protection against unauthorized access (cloning) to the subscriber identity module which is reserved solely for the card user. A further advantage of the invention is that by detecting the "cloned" SIM card, the network operator can avoid discussions, without evidence, relating to bills that are incorrect because they are too high.

In accordance with an added feature of the invention, there is provided a step of using the mobile station to transmit location information about the mobile subscriber together with the subscriber identity when responding to the radio paging message. This information is evaluated at the network end. In addition to the information about the SIM card that is being used without authorization, this also provides information about the location, thus allowing rapid access to the user of the other mobile station who is misusing a card.

In accordance with an additional feature of the invention, evaluation of the received information is carried out by an operation and maintenance center in the radio communication network. The result of the evaluation is transmitted to the network operator of the radio communication network in order to protect the subscriber identity module against misuse. This allows the information about any possible misuse to be passed on directly to a higher-level facility, to which the network operator has direct access, and allows appropriate measures to be taken by the network operator to filter or stop the unauthorized subscriber.

In accordance with another feature of the invention, a list of subscriber identities of those mobile stations which transmit a response to the radio paging message received in the old supply area is produced for the network operator.

In accordance with a further feature of the invention, a counter is set up at the network end for the mobile subscriber to store or determine the number of changes in supply area. The additional transmission of the radio paging message to the old supply area is controlled as a function of a predetermined count being reached. This avoids any dynamic load on the radio interface which could possibly occur in the old area due to the additional paging for security purposes. The additional "paging" of the old area is initiated only when the count, corresponding to a threshold value, is reached, rather than on each occasion when the management of the mobile subscriber is updated due to a movement from one supply area to another.

In accordance with yet an added feature of the invention, the counter is preferably set up in a subscriber database in the radio communication network. The database initiates canceling of the data stored in the previously responsible subscriber database and on when the count is reached, transmits a control character, by means of which the previously responsible subscriber database is requested to transmit the additional radio paging message.

In accordance with yet an additional feature of the invention, the additional transmission of the radio paging message at the network end to the old supply area can be controlled as a function of the traffic load in this supply area. A switch-on/switch-off functionality is provided for the additional paging to the old supply area, which causes the paging option to be switched off if the traffic load is high and the paging option to be switched on, for example by the network operator, when the traffic load is low.

With the foregoing and other objects in view there is provided, in accordance with the invention, a radio communication network for protecting a subscriber identity module configured in a mobile station. The radio communication network includes a mobile station having a subscriber identity module for identifying a mobile subscriber. The mobile station initiates updating of the management of the mobile station when the mobile station is moved from an initial supply area to a new supply area. A network portion is provided that has an initially responsible subscriber database for storing subscriber data. The network portion cancels the subscriber data from the initially responsible subscriber database after the mobile station has initiated updating of the management of the mobile station. The network portion includes a device for transmitting a radio paging message to mobile stations located in the initial supply area. The network portion also includes a device for evaluating a mobile subscriber identity of a responding mobile station that responds to the radio paging message.

In accordance with concomitant features of the invention, the responding mobile station includes a device for transmitting location information about the mobile subscriber and for transmitting the mobile subscriber identity of the responding mobile station when responding to the radio paging message. The network portion includes a device for evaluating the location information. The network portion includes an operation and maintenance center for evaluating both the location information and the subscriber identity transmitted from the responding mobile station. The operation and maintenance center is also for transmitting a result of the evaluation to a network operator to protect the subscriber identity module of the mobile station from misuse.

Other features which are considered as characteristic for the invention are set forth in the appended claims.

Although the invention is illustrated and described herein as embodied in a method and a radio communication network for protecting a subscriber identity module configured in a mobile station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE shows the message flow between mobile stations and the network facilities in a radio communication network.

DESCRIPTION OF THE PREFERRED EMBODIMENTS

A mobile subscriber uses a mobile station MS in a known manner to communicate with other subscribers in a communication network, or with their network facilities. Information relating to communication links between the mobile station MS and the network facilities is interchanged in both transmission directions (downlink, uplink) via a radio interface of a radio communication network, which is preferably in cellular form. The radio communication network may, for example, be a present-day GSM network, or a future UMTS network (Universal Mobile Telecommunication System), or any other network. The mobile station MS has transmitting/receiving devices to transmit and receive radio signals which may include voice and data. At least one control device and one storage device are normally connected to the transmitting/receiving devices. On the input side, each mobile station MS has an input/output interface which, in the present example, receives the subscriber inputs by a user who is a mobile subscriber, and who is normally the holder of the terminal. A subscriber identity module SIM is connected on the output side, which module is also referred to as a SIM card, and is normally in the form of a smart card. The mobile subscriber can use the subscriber identity module to identify himself in the respective network in which he is registered. The subscriber identity module stores subscriber-related data, for unique identity.

In the present example, the radio communication network is broken down into a radio subsystem BSS (Base Station Subsystem) configured at the radio interface and having base stations which each control at least one radio cell and to which base station controllers have been connected. The radio communication network also includes a switching subsystem connected to the radio subsystem and having subscriber databases such as visitor registers NVLR (New Visitor Location Register), and OVLR (Old Visitor Location Register) and at least one home register HLR (Home Location Register). The radio communication network also includes switching centers MSC (Mobile Switching Centers) which are in each case associated with the subscriber database NVLR, OVLR.

The mobile subscriber often moves with his mobile station MS from an original supply area, for example a radio cell OLDC, into a new supply area, for example a radio cell NEWC. The mobile station MS thus decides to start an update of the management resulting from the change in the supply area. It thus transmits an updating message LUP (Location Update) in the radio cell NEWC, via the appropriate radio subsystem BSS, to the responsible switching center MSC at the network end with the new connected visitor register NVLR. For identification purposes, the updating message LUP includes a temporary mobile subscriber identity TMSI (Temporary Mobile Subscriber Identity) as well as previously valid location information LAI, for example an area identity.

The new visitor register NVLR produces and then transmits a message SENDP to the old visitor register OVLR, by means of which it asks for the international mobile subscriber identity IMSI as well as for the security parameters PAR which are required for subscriber authentication. The old visitor register OVLR uses a response message RESP to transmit the data IMSI and PAR so that the new visitor register NVLR carries out the subscriber authentication in a known manner with the aid of the received data. After this, the new visitor register NVLR produces and transmits a request message REQSD to the home register HLR. The data SDATA stored in the home register HLR for the mobile subscriber is transmitted to the new visitor register NVLR in response to the request message REQSD.

The updating procedure is continued in a known way by the home register HLR. The home register HLR initiates removal of data entered in the old visitor register OVLR for the mobile subscriber as shown in the subsequent cancel message CCLO (cancel location) sent to the old visitor register OVLR. A counter CT for storing and/or determining the number of supply area changes and thus the number of updating procedures required is preferably set up in the home register HLR for the mobile subscriber. The current count is compared with a count MAX which is equivalent to a threshold value and which can be predetermined. When this count MAX is reached, the home register HLR sets a control character FL and transmits this in the message CCLO to the previously responsible visitor register OVLR. By evaluating the arriving message content, the old visitor register OVLR identifies the control character FL and initiates the transmission of a radio paging message PAGE in the old supply area. That is to say in the radio cell OLDC to the mobile stations MS located in it (downlink). As with any "paging" process, the radio paging message is transmitted via the appropriate base station in the radio subsystem BSS. The use of the counter CT for controlling the transmission occurrence of the additional radio paging message has the advantage that the radio paging message is not additionally transmitted to the previous supply area with every cancel message CCLO. The radio paging message is only transmitted when the control character FL has been set after reaching the threshold value MAX, for example after every fifth updating procedure with a corresponding cancel message. This avoids a dynamic load on the radio interface that could possibly occur in the old supply area due to the additional paging for security purposes.

In another preferred embodiment of the invention, the additional transmission of the radio paging message PAGE in the old supply area can be controlled at the network end as a function of the traffic load in this supply area. For example, the transmission could be performed by the base station responsible for this old supply area or by the base station controller connected to it in the radio subsystem BSS. A switch-on/switch-off functionality for the additional paging in the old supply area is therefore provided, which results in the paging option being switched off when the traffic load is high. The paging option can be switched on, for example, on the initiative of the network operator when the traffic load is low.

In the situation where one of the mobile stations MS in the radio cell OLDC that has received the radio paging message PAGE reacts and transmits a response message PRESP in the opposite direction (uplink), which response message PRESP contains at least the subscriber identification IMSI, and preferably, the location information LAI, the invention results in the arriving subscriber identification IMSI being evaluated at the network end. To do this, the switching center MSC associated with the previously responsible visitor register OVLR generates a message NOTI that contains the subscriber identity IMSI together with location information LAI. The switching center MSC transmits this message NOTI to a higher-level network facility, preferably to the operation and maintenance center OMC in the radio communication network. This network facility completes the evaluation of the received information IMSI, LAI, and transmits the result of the evaluation to the network operator of the radio communication network, who then takes measures to protect the subscriber identity module against misuse. For example, the network operator can inform the authorized card user, can block the card, by blocking access of the unauthorized user of the "cloned" SIM card, etc.

The respective old visitor register OVLR with the associated switching center MSC preferably produces for the network operator a preferably continuous list LIST of subscriber identities IMSI of those mobile stations which in each case transmit response messages PRESP to the radio paging message PAGE received in the old supply area.

The updating procedure is ended in a known way by the visitor register NVLR that is currently responsible for the mobile subscriber. The visitor register NVLR allocates a new temporary mobile subscriber identity TMSI and transmits this in a message SEND via the appropriate base station in the radio subsystem BSS to the mobile station MS in the radio cell NEWC.

I claim:

1. A method for protecting a subscriber identity module in a mobile station, which comprises:

providing a network portion for establishing a radio communication network with mobile stations;

using a subscriber identity module to identify a mobile subscriber associated with a particular one of the mobile stations;

when the particular one of the mobile stations is moved from an initial supply area to a new supply area, using the particular one of the mobile stations to initiate updating of the management of the mobile station;

subsequently, canceling subscriber data, associated with the particular one of the mobile stations, stored in a previously responsible subscriber database at the network portion;

transmitting a radio paging message from the network portion to mobile stations in the initial supply area; and if at least one of the mobile stations in the initial supply area responds to the radio paging message and transmits a mobile subscriber identity, using the network portion to evaluate the mobile subscriber identity that has been received from the at least one of the mobile stations.

2. The method according to claim 1, which further comprises:

using the at least one of the mobile stations to transmit location information about the mobile subscriber when responding to the radio paging message; and using the network portion to evaluate the location information.

3. The method according to claim 1, which further comprises:

providing the network portion with an operation and maintenance center;

using the operation and maintenance center to perform the step of evaluating the mobile subscriber identity that has been received from the at least one of the mobile stations; and transmitting the result of the evaluation to a network operator to protect the subscriber identity module from misuse.

4. The method according to claim 1, wherein a plurality of mobile stations in the initial supply area have responded to the radio paging message; and which further comprises:

providing a list, for a network operator, of mobile subscriber identities of the plurality of mobile stations in the initial supply area that have responded to the radio paging message.

5. The method according to claim 1, which further comprises:

provides the network portion with a counter for storing a variable indicating a number of times that the particular one of the mobile stations has been moved to another supply area; and only when the variable equals or exceeds a predetermined number, performing the step of transmitting the radio paging message.

6. The method according to claim 5, which further comprises:

providing the network portion with a subscriber database that includes the counter;

using the subscriber database to initiate the step of canceling subscriber data stored in the previously responsible subscriber database;

only when the variable equals or exceeds a predetermined number, using the subscriber database to initiate transmission of a control character for requesting the previously responsible subscriber database to initiate performing the step of transmitting the radio paging message.

7. The method according to claim 1, which further comprises performing the step of transmitting a radio paging message as a function of a traffic load in the initial supply area.

8. A radio communication network for protecting a subscriber identity module configured in a mobile station, the radio communication network comprising:

a mobile station having a subscriber identity module for identifying a mobile subscriber, said mobile station initiating updating of the management of said mobile station when said mobile station is moved from an initial supply area to a new supply area; and a network portion having an initially responsible subscriber database for storing subscriber data, said network portion canceling the subscriber data from said initially responsible subscriber database after said mobile station has initiated updating of the management of said mobile station;

said network portion including a device for transmitting a radio paging message to mobile stations located in the initial supply area;

said network portion including a device for evaluating a mobile subscriber identity of a responding mobile station that responds to the radio paging message.

9. The radio communication network according to claim 8, comprising:

said responding mobile station, said responding mobile station including a device for transmitting location information about the mobile subscriber and for transmitting the mobile subscriber identity of said responding mobile station when responding to the radio paging message;

said network portion including a device for evaluating the location information.

10. The radio communication network according to claim 9, wherein:

said network portion includes an operation and maintenance center for evaluating both the location information and the subscriber identity transmitted from said responding mobile station, said operation and maintenance center for transmitting a result of the evaluation to a network operator to protect the subscriber identity module of said mobile station from misuse.

* * * * *